Kiyoshi Itakura,
INVENTOR

Kiyoshi Itakura,
INVENTOR

BY Wenderoth, Lind
and Ponack,
Attorneys

Fig. 5
Fig. 6
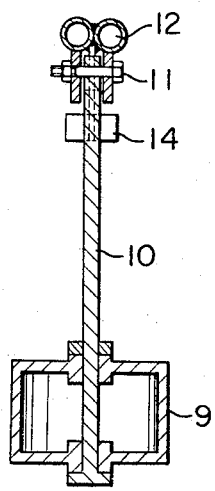
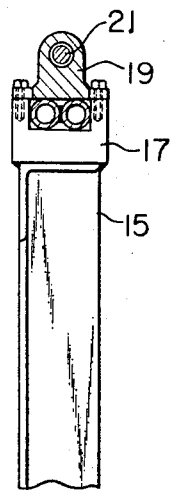

United States Patent Office 3,506,428
Patented Apr. 14, 1970

3,506,428
APPARATUS FOR REGULATING POSITION OF
A GLASS RIBBON
Kiyoshi Itakura, Kobe, Japan, assignor to Nippon Sheet
Glass Co., Ltd., Higashi-ku, Osaka, Japan
Filed Jan. 27, 1967, Ser. No. 612,248
Claims priority, application Japan, Feb. 1, 1966,
41/5,367
Int. Cl. C03b 18/00
U.S. Cl. 65—182                          6 Claims

ABSTRACT OF THE DISCLOSURE

Apparatus for regulating lateral position of glass ribbon proceeding atop molten metal bath. A glass-guiding, rod-mounted, contact member is pivotally mounted to and hangs from a supporting member at opposite sides of the glass ribbon. Each contact member includes a contact element having a cylindrical surface and is rotatably mounted around the rod. When the glass ribbon deviates to one side or the other, the cylindrical contact element on the end of the rod tends to be laterally displaced around its pivotal mounting by said progressing ribbon. A spring interconnecting each rod and its supporting member acts to limit and regulate said glass ribbon deviation and displacement; and a stop abutment limits opposite displacement of the rod-mounted contact element as it is biased back by the spring.

---

This invention relates to an apparatus for regulating position of a glass ribbon atop a molten metal bath in an apparatus used for manufacture of a glass ribbon wherein glass is made to proceed atop a molten metal bath.

In manufacture of a glass ribbon wherein glass is made to proceed atop and along a molten metal bath, due to a slight change of temperature distribution within said molten metal bath, and so forth, sometimes glass kept in a molten state atop the molten metal bath tends to deviate either to the left or the right from its central portion. When this state continues, the glass ribbon proceeds atop the bath while deviating from its correct path and during the period when the glass ribbon leaves the bath and is carried to a cutting place via and annealing furnace as by transfer rollers. If the glass ribbon proceeds while it is deviated, therefore, the subsequent operation to cut the glass sheet into a predetermined width at the cutting place becomes difficult. Further, due to this phenomenon of deviation, without regulating means sometimes the side portions of the glass ribbon stray off from rolls grasping or supporting said glass and it collides with the side wall of the bath tub or the side wall of the annealing furnace, therefore, impairing stable and easy manufacture of glass sheets.

An object of the present invention is to provide apparatus to stably manufacture glass sheets by eliminating such shortcomings and this object is achieved by the apparatus of this invention for laterally regulating the position of a glass ribbon.

The foregoing object may be achieved by the provision of at least one pair of elements provided on both sides of a glass ribbon made to proceed atop the bath, each of said elements comprises (1) a supporting member, (2) a contact member pivoted to and hung from said supporting member and capable of making a lateral pivotal displacement around a pivot in one vertical plane, said contact member having a portion consisting of a rotatably mounted body, said portion being rotatable around the axis of said body when the glass ribbon proceeds while contacting one or the other side edges with the surface of said body portion, (3) pressure means for imparting an inwardly directed pressing force to the side edge of the glass ribbon via said contact member upon displacing of said contact member as a result of the deviation in a transverse direction of the glass ribbon thereby correcting said deviation of the glass ribbons, and (4) means for limiting the inwardly directed displacement of said contact member responsive to said pressure means.

Figure 1:
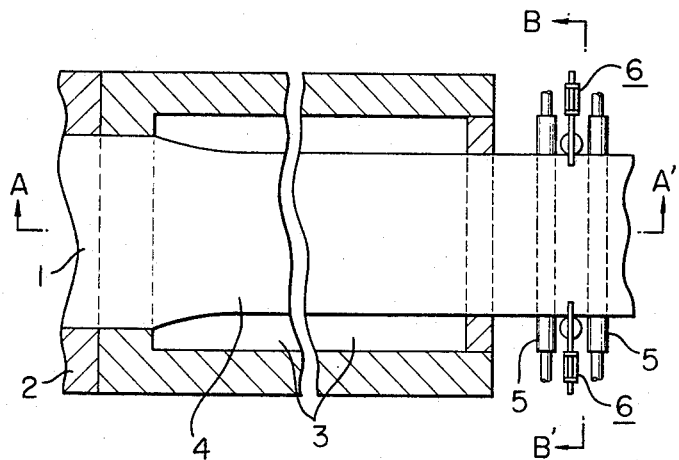
Figure 2:
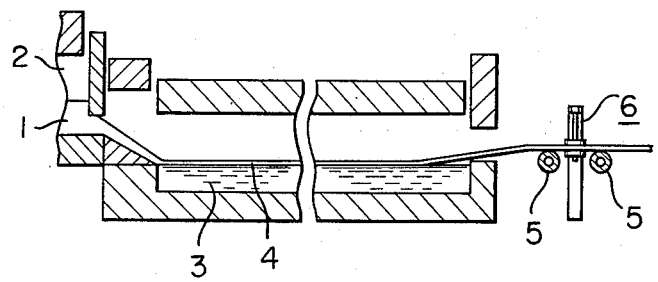
Figure 3:
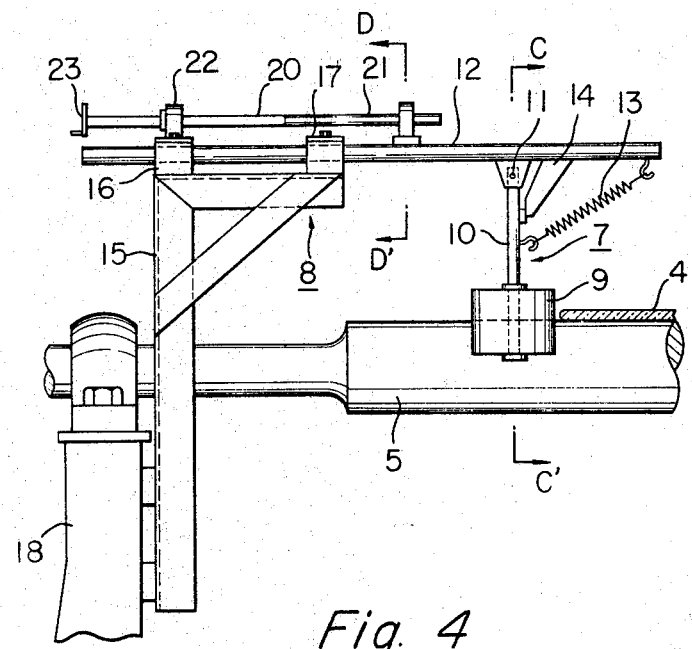
Figure 4:
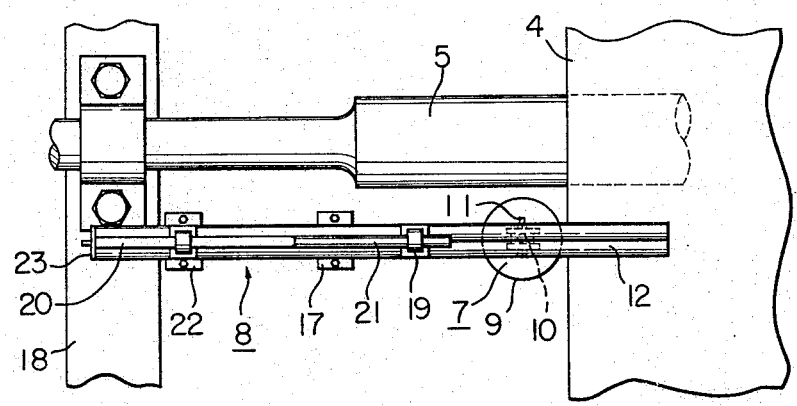

Referring to the accompanying drawings, FIG. 1 is a diagrammatic plan view for the purpose of explaining an apparatus for manufacturing a glass ribbon provided with one embodiment of the apparatus according to this invention for regulating lateral position of a glass ribbon atop a metal bath; FIG. 2 is a side elevation in longitudinal section taken along line A–A' of FIG. 1; FIG. 3 is a partially enlarged front elevation in cross section taken along line B–B' of FIG. 1 for the purpose of explaining one embodiment of the apparatus of this application; FIG. 4 is a plan view of the apparatus shown by FIG. 3; FIG. 5 is an enlarged section taken along line C–C' of FIG. 3; and FIG. 6 is an enlarged section taken along line D–D' of FIG. 3.

In FIGS. 1 and 2, molten glass from a forehearth 2 of a glass-melting furnace upon a molten metal bath 3 to become a glass ribbon as it proceeds atop the bath. A cooled and sufficiently solidified glass ribbon leaves the molten metal bath and is carried to a annealing furnace and a cutting place by transfer rolls 5. Between a first roll and a second roll of the transfer rolls 5, and on both sides of the glass ribbon, the apparatus for regulating the lateral position of the glass ribbon of this invention is provided. This apparatus consists of a pair of elements 6. Details of said elements 6 are shown in FIGS. 3–6.

In FIGS. 3–6, each of the elements 6 consists of a supporting member 8, a contact member 7, pressure means 13 and pressure regulating or stop means 14. Said contact member 7 consists of a rotatable contact element 9 having a cylindrical surface and a rod 10 passing the axial center of the contact element and loosely engaging with the contact element so that said element may rotate. The upper tip of the rod 10 is pivotally attached to a supporting rod 12 of a supporting member 8 by a pin 11, and the rod 10 is capable of making lateral pivotal displacement in one vertical plane around the pin 11. One end of an expandable member such as a spring 13 is connected to about the center of the rod 10, while the other end thereof is connected to a supporting rod 12, said spring 13 being capable of energizing an inwardly directing (directing to the right in FIG. 3) force to the contact element 9 when the contact element 9 displaces outwardly (to the left in FIG. 3) due to transverse or lateral deviation of the glass ribbon 4. Said force is transmitted from the contact element 9 to the side end of the glass ribbon 4 to correct said deviation of the glass ribbon 4. An abutment 14 fixed to the supporting rod 12 restricts said inward movement of the contact element 9. The supporting rod 12 preferably consists of two parallel welded pipes. The supporting rod 12 is supported by guide frames 16, 17 fixed at the upper part of a supporting frame 15 and can be transferred transversely according to necessity. The supporting frame 15 is mounted on a fixed beam 18 supporting the bearing of the transfer rolls. On the supporting rod 12, a bearing 19 provided with a female screw is fixed. An adjusting spindle 20 has a male screw 21 engaging with said female screw, said spindle 20 being supported by a bearing 22 provided on the guide frame 16 and said bearing 19. By rotating a handle 23 of the spindle 20, the supporting rod 12 is transferred laterally on the supporting frame 15 whereby position of the pin 11, and accordingly position of the contact element 9 also can be precisely adjusted.

When a glass ribbon having a constant width is at a predetermined central position, position of the contact element 9 is adjusted by the handle 23 of the spindle 20 initially or in advance so that the side end of said glass and the contact element of the contact member may be placed at a slight distance without contacting with each other. When position of the glass ribbon deviates either to the left or to the right, the contact element 9 contacts with the side edge of the glass ribbon 4 at the side to which the glass ribbon has deviated. When the contact member 7 pivotally displaces around the pin 11 due to transverse deviation of the glass ribbon 4, an opposite pressing force in proportion to amount of said displacement is imparted to the side edge of the glass ribbon by a spring 13 via the contact element 9. The glass ribbon 4 receiving said pressing force transfers to the center while keeping its width, and as a result, deviation tends to be eliminated. While the contact element 9 keeps contact with the side edge of the glass ribbon, as the glass ribbon proceeds atop the metal bath, the contact element 9 rotates around the rod 10 to reduce friction.

When the apparatus of this invention is used, because deviation of a glass ribbon atop a molten metal bath is inhibited, deviation of the glass ribbon at a cutting place disappears whereby the cutting operation is facilitated. Additionally, it precludes the glass ribbon from leaving the aforesaid grasping and/or transfer rolls and collision of the glass ribbon with the side wall of the bath and the side wall of the annealing furnace due to deviation of the glass ribbon is precluded, whereby it is possible to stably manufacture a glass ribbon.

Also, when the apparatus of this invention is used, since the contact member is made to move or rotate with the glass at the contact surface while it contacts with the side edge of the glass ribbon deviating transversely, friction due to said contact is minimized, and accordingly, the side edge of the glass is neither greatly transformed nor damaged.

The surface of the aforesaid rotatable body of the contact element does not have to be cylindrical, but it may be a surface of other body of rotation such as a rotary hyperboloid. It is advantageous that the contact element is freely rotatable, however, it may be made rotatable by driving.

The apparatus of this invention can be provided at both sides of the glass ribbon on the molten metal bath or on the transfer rolls, however, it is preferable that it be mounted in the vicinity of the outlet of the molten metal bath, where the atmosphere is not at such a high temperature and the glass is still in a state of being capable of transforming. In addition, because the glass is close to the molten metal bath where the phenomenon of deviation occurs, operations for regulating the lateral position can be carried out easily. Accordingly, in this embodiment, a pair of the right and left apparatus of this invention is provided, however, when at least two pairs thereof are provided, greater effects are obtained.

Accordingly, an improved lateral positioning apparatus has been evolved which achieves all of the advantages and objectives set forth in the foregoing specification.

What is claimed is:
1. An apparatus for regulating the lateral position by correcting deviation of a glass ribbon as it floatingly proceeds atop a molten metal bath in an apparatus used for manufacture of a glass ribbon, said position regulating apparatus comprising:
   (a) at least one pair of glass-guiding elements provided with one on each side of said glass ribbon,
   (b) each of said elements comprising:
      (1) a supporting member connected to a support,
      (2) glass-contacting means including a contact member mounted on a rod and pivot means for mounting said rod in depending fashion from said supporting member to permit lateral displacement around said pivot means in a vertical plane transverse to a longitudinal float direction of and away from the glass ribbon;
      (3) said contact member being freely rotatable on said rod concentric with the axis of said rod in response to a side edge of the glass ribbon contacting therewith,
      (4) pressure means for correcting deviation of said glass ribbon due to any transverse deviation of said glass ribbon, by urging said contact member against the side edge of the deviating glass ribbon and thereby imparting an opposite and inwardly directed force thereto via said contact member,
      (5) said pressure means including an expandable member having one end connected to said rod and the other end connected to said supporting member, and
      (6) stop means adjacent to and for limiting said inwardly directed force of said contact member.

2. Apparatus as defined in claim 1 wherein a pair of said glass guiding elements are disposed outside, and in the vicinity of, the outlet of the molten metal bath.

3. Apparatus as defined in claim 2 wherein said expandable member of the pressure means is a spring.

4. Apparatus as defined in claim 3 wherein a pair of said glass-guiding elements are respectively disposed outside the predetermined normal passage of the glass ribbon, and said elements with said contact members and said stop means are so arranged that said contact members are normally not in contact with the side edges of said glass ribbon as it normally advances on its predetermined passage, and said contact members being urged by said pressure means against a side edge of the glass ribbon only responsive to deviation thereof from said predetermined normal passage.

5. Apparatus as defined in claim 4 wherein the support includes a supporting frame, means slidably mounting said supporting member on said supporting frame for generally horizontal movement in a direction transverse to the longitudinal direction of the glass ribbon, and said stop means are disposed on said supporting member.

6. An apparatus as defined in claim 5 further including means for laterally adjustably shifting said supporting member including a slidable and rotatable spindle provided with a male screw portion in engagement with a female screw member the latter of which is mounted on said supporting member, means slidably mounting said spindle to effect lateral sliding movement thereof and of said supporting member to position said stop limiting means and contact member in a manner such that normally said contact member will not be in contact with a side edge of the glass ribbon when the latter normally advances free of lateral deviation, and that said contact member will be urged by said pressure means against a side edge of said glass ribbon only when the latter deviates from said predetermined normal passage.

References Cited

UNITED STATES PATENTS 1,872,776   8/1932   Mambourg _____ 65—91
3,409,423   11/1968   De Lajarte _____ 65—182

S. LEON BASHORE, Primary Examiner

E. R. FREEDMAN, Assistant Examiner

U.S. Cl. X.R.
65—65, 99, 201